Aug. 9, 1966   F. W. SCHLENSKER   3,264,793
FASTENING DEVICE FOR CLADDING PANEL
Filed June 27, 1963
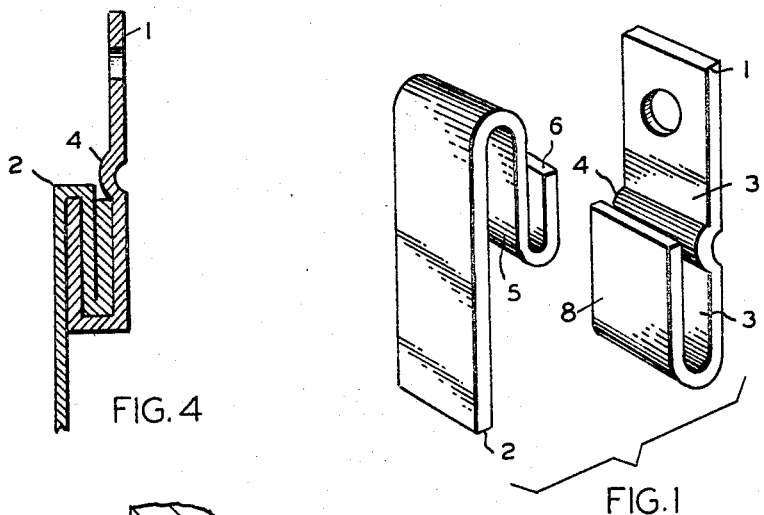
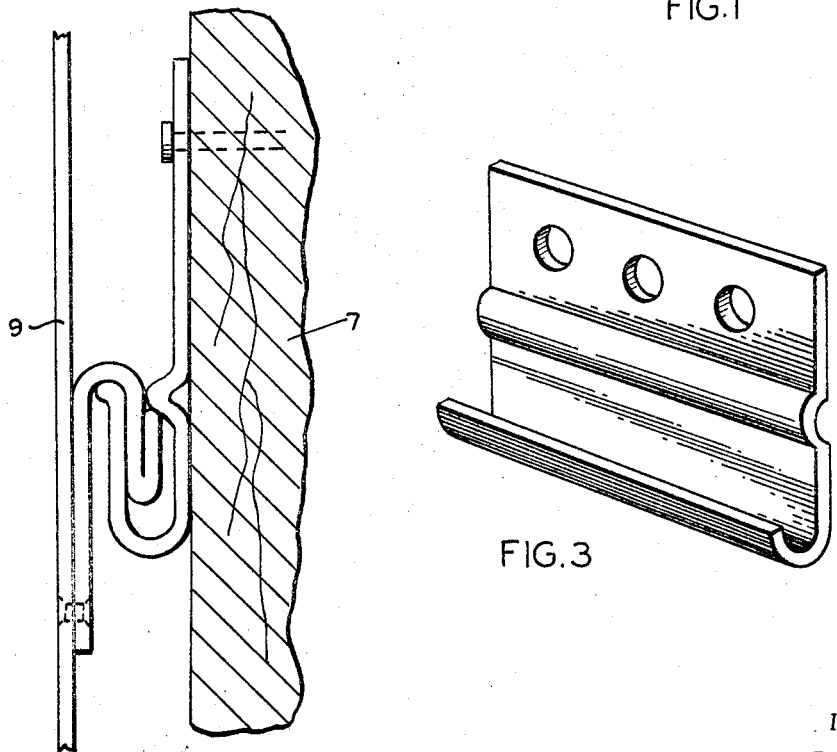
INVENTOR
FRED W. SCHLENSKER
BY *Milton J. Simmons*
ATTORNEY United States Patent Office 3,264,793
Patented August 9, 1966

3,264,793
FASTENING DEVICE FOR CLADDING PANEL
Fred W. Schlensker, North Royalton, Ohio, assignor to Ferro Corporation, a corporation of Ohio
Filed June 27, 1963, Ser. No. 291,090
7 Claims. (Cl. 52—511)

The present invention relates to fastening devices, and more particularly to a means for fixing cladding members to structural substrates.

The popular trend toward building design which calls for veneer clad walls, consisting essentially of either wood or masonry subwalls to which is affixed a decorative and protective veneer of relatively thin cladding members, usually in the form of panels, has dictated the need for quick, efficient, labor-saving devices for firmly interconnecting the cladding veneer to the substrate.

A number of fastening devices have evolved over the years, exemplified by those disclosed and claimed in United States Patents 2,317,015 and 2,818,948.

However, it does not appear that any of the prior fastening devices are of such design as would promote the rapid fastening of cladding panels to subwalls, which is so essential in this day of high labor costs.

It is therefore an object of the present invention to provide fastening means for structural veneer cladding panels.

It is a further object of this invention to provide such fastening means to guarantee a minimum of upward, vertical displacement after cladding panels have been fixed in place with my device.

Still a further object of this invention is to provide a building wall clad with a veneer using my novel fastening means.

Further objects and advantages of this invention will become apparent as the following disclosure progresses wherein:

FIG. 1 is a perspective view of the hooks comprising my invention; and

FIG. 2 is a cross section of a panel fixed to a substrate utilizing the hooks of FIG. 1; and FIG. 3 is a perspective view of a variation of my primary hook; and FIG. 4 is a cross section of a variation of the hooks of FIG. 1, shown in hooked relationship.

Briefly stated, and as will be apparent from the following description, my invention consists in a device for fastening cladding members to substrates comprising a hook that is first fastened to the substrate, another corresponding hook that is fastened to the cladding member, the hook fastened to the substrate engaging and holding the hook fastened to the cladding member, thereby holding the cladding member in the desired spaced relationship with respect to the substrate. My hooks are characterized by the hook fastened to the substrate, hereinafter referred to generally as the primary hook, having a shank with a return curve emanating from said shank and terminating in a free leg to describe generally a U configuration with respect to said shank, the free leg of said primary hook pointing generally upward, said shank of said primary hook having a raised flange positioned on its surface opposite the surface thereof adapted to face the substrate while said primary hook is fixed thereto, said flange generally horizontal when the substrate is vertical, and a hook fixed to the cladding member, hereinafter referred to generally as the secondary hook, said secondary hook having a shank, through which said hook is fixed to said cladding member, said secondary hook having a return curve terminating in a free leg to describe generally an inverted U with respect to said primary hook, said free leg of said secondary hook pointing generally downwardly when the structural substrate is vertical, thus permitting said secondary hook to engage said primary hook in hooked relationship, said secondary hook having on the surface of its free leg, contiguous with the convex surface of said inverted U, a locking lug for engaging said flange on said primary hook when said hooks are engaged in hooked relationship. The cladding member, supported by the secondary hook fixed thereto, being thereby retained in generally parallel spaced relationship with said substrate.

Proceeding now to the attached drawings in FIG. 1, the hooks which comprise my invention are illustrated in their respective relationship just prior to engagement. The primary hook is designated generally by the reference numeral 1 and the secondary hook by the reference numeral 2. The hooks are preferably made of sheet metal, and as will be seen, the primary hook has had formed into its shank 3, in its surface contiguous with the inside loop of the hook formed, a raised flange 4.

The secondary hook 2 has had its free leg 5 doubled back in a return to form a lip, or lug, 6 along the surface of the free leg of the secondary hook contiguous with the outside surface of the loop formed by said hook.

As will be readily apparent from FIG. 2, the primary hook may be fixed by its shank, by driving a nail therethrough, to a substrate, in this particular instance a vertical stud 7, so that the free leg 8 of said primary hook projects outwardly from the stud substrate. Secondary hook 2 has been fixed by spot welding its shank to the interior surface of a cladding panel, shown in cross section in FIG. 2, and designated generally by the reference numeral 9, with the free leg 5 of the secondary hook projecting away from the interior surface of cladding panel 9. In addition to the means mentioned for fixing the respective hooks to substrate and cladding means, it is contemplated that any suitable means will suffice for fixing the primary hook to the substrate and the secondary hook to a cladding panel.

Thus, in practice, it is a relatively simple matter to nail a series of primary hooks as desired, as shown in FIG. 2, to the substrate, depending upon the location of the secondary hooks as previously welded to the interior surface of the cladding member, after which the entire cladding member is lifted into close parallel proximity to the substrate, with the free leg of the secondary hook on the interior face of the cladding member just slightly above the edge of the free leg of the primary hook, then gently sliding the cladding panel downwardly until the primary hooks engage and support the secondary hooks and the cladding panels to which they are affixed.

The crux of my inventive concept, as will be apparent from the foregoing, lies in a locking feature achieved by the locking lug 6 of the secondary hook engaging flange 4 of the primary hook to restrain the cladding member from vertical displacement. In the preferred embodiment of my invention, the primary hook is of resilient, spring sheet metal; this permits the primary hook to be readily distorted temporarily, to permit the double thickness of the free leg of the secondary hook to be forced between the flange and the free leg of the primary hook, which springs back to its original position after the locking lug of the secondary hook has passed flange 4 of the primary hook.

While the illustrated embodiment of my invention depicts a primary hook having a rather long shank, with respect to the width of its flange, it is entirely within the scope of this invention that the primary hook could be made much wider than it is high which would permit the cladding panel to be dropped into place as described above, and then slid horizontally to adjust same laterally without the need for changing the position of the primary hooks. An alternate embodiment of my primary hook is depicted in FIG. 3, designed to accomplish the foregoing benefit.

Too, while the preferred embodiment of my invention is depicted in combination with vertical substructures and cladding members, it is also to be understood that, with but slight modifications, my novel fastening device could be utilized for fixing horizontal ceiling panels to a horizontal substrate, or roofing members, such as shingles, to various roofing substrates for ease and rapidity of application, as well as permanence and freedom from displacement. Too, while the preferred embodiment, and appended claims, refer to a "U"-shaped hook it is to be understood that the term "U" is used very broadly to designate any such similar hook structure, and my invention contemplates that a pair of angular hooks as depicted in FIG. 4 would serve the purpose just as well.

Furthermore, while the locking lug on the secondary hook is formed by doubling back on the free leg, and permitting the exposed edge to act as a lug, and the flange in the primary hook is pressed into its shank, it is to be understood that the locking lug on the secondary hook could be formed by welding a strip of metal across that position, or by any other suitable means, and the flange on the shank could in like manner be achieved by any other suitable means.

Thus, while certain features of my invention have been more or less specifically set forth for the purpose of illustration, it is to be understood that changes may be resorted to in the details of construction and arrangement of parts shown without departing from the basic scope of the following claims.

Having thus described my invention I claim:

1. Clip means for fastening a cladding member to a substrate comprising the combination of
    (a) a primary hook having a shank, said primary hook adaptable to be fixed via its shank to a substrate, said primary hook having a return curve terminating in a free leg to describe generally a U configuration with respect to said shank, said shank having a raised flange positioned on its surface opposite a surface thereof adapted to face said substrate while said primary hook is fixed thereto, and
    (b) a secondary hook having a shank, said secondary hook adaptable to be fixed via its shank to a cladding member, said secondary hook having a return curve terminating in a free leg to describe generally an inverted U with respect to said primary hook, thus permitting said secondary hook to engage said primary hook in hooked relationship, said secondary hook having on the surface of its free leg, contiguous with the convex surface of said inverted U, a locking lug for engaging said flange on said primary hook when said hooks are engaged in hooked relationship, to restrain disengagement of said hooks.

2. The clip means of claim 1 wherein said primary hook is adaptable to be fastened to the cladding member, said secondary hook is adapted to be fixed to said substrate, and each is adapted to receive the other in inverted relationship to their respective positions of claim 1.

3. Clip means for fastening a cladding member to a substrate comprising the combination of
    (a) a primary hook composed of resilient sheet metal, said primary hook having a shank, said primary hook having a return curve terminating in a free leg to describe generally a U configuration with respect to said shank, means for fixing said primary hook to a substrate via its shank in such a manner that the surface of said shank contiguous with the convex surface of said U is generally parallel to said substrate when fixed thereto, and said free leg is in non-contacting relationship to said substrate, said primary hook having a flange positioned on the surface of its shank contiguous with the concave surface of said U, and
    (b) a secondary hook of sheet metal, said secondary hook having a shank, means for fixing said secondary hook via its shank to a cladding member, said secondary hook having a return curve emanating from its shank and terminating in a free leg to described generally an inverted U with respect to said primary hook to permit said secondary hook to engage said primary hook in hooked relationship, said secondary hook having on the surface of its free leg, contiguous with the convex surface of said inverted U, a locking lug for engaging said flange on said primary hook when said hooks are engaged in hooked relationship,
to restrain disengagement of said hooks.

4. The clip means of claim 3 wherein said primary hook is adaptable to be fixed to said cladding member, said secondary hook is adapted to be fixed to said substrate, and each is adapted to receive the other in inverted relationship with respect to their respective positions in claim 3.

5. Clip means for fastening a cladding member to a substrate comprising the combination of
    (a) a primary hook formed of resilient sheet metal having a shank, said primary hook having a return curve emanating from said shank and terminating in a free leg to describe generally a U configuration with respect to said shank, means for fixing said primary hook to a substrate via said shank in such a manner that the surface of said shank contiguous with the convex surface of said U is generally parallel to said substrate, said primary hook having a flange on the surface of said shank contiguous with the concave surface of said U, said free leg terminating in a substantially straight edge, generally parallel to said flange, and,
    (b) a secondary hook of sheet metal having a shank, means for fixing said secondary hook by its shank to a cladding member, said secondary hook having a return curve emanating from its shank and terminating in a free leg to describe generally an inverted U with respect to said primary hook, thus permitting said secondary hook to engage said primary hook in hooked relationship, said free leg of said secondary hook having on its surface which is contiguous with the convex surface of said inverted U a locking lug for engaging said flange on said primary hook when said hooks are engaged in hooked relationship, the loop of the inverted U of said secondary hook resting in supported contact on its concave surface, on, and carried by, said substantially straight edge of the free leg of said primary hook.

6. The clip means of claim 5 wherein said primary hook is adaptable to be fixed to said cladding member and said secondary hook is adaptable to be fixed to said substrate, and each is adapted to receive the other in inverted relationship with respect to their respective position in claim 5.

7. The combination of a substantially vertical, clad building wall consisting of cladding panels fixed in generally parallel spaced relationship with respect to the clad surface of said wall, said wall and said panels having a multiplicity of connecting means interposed therebetween consisting of primary hooks formed of resilient sheet metal having substantially flat shanks, said flat shanks having a longitudinal axis which is generally vertical, said primary hooks fixed to said wall by nailing means driven through said shanks and into said wall, the said primary hooks having return curves emanating from said shanks and terminating in respective free legs to describe generally U configurations with respect to said shanks, said primary hooks having respectively flanges on the surfaces of said shanks contiguous with the respective concave surfaces of said U's, said free legs of said primary hooks in non-contacting relationship to said wall, said free legs of said primary hooks respectively terminating in substantially straight edges, generally parallel to said flange, both said flange and said straight edges generally horizontal, secondary hooks in hooked relationship with said primary hooks, said secondary hooks composed of sheet metal having, respectively, shanks, said secondary hooks fixed to the interior surface of said panels by welding means, said secondary hooks having return curves emanating from their shanks respectively and terminating in respective free legs to describe inverted U's with respect to said primary hooks, said free legs respectively of said secondary hooks having on their respective surfaces, which are contiguous with the convex surface of said inverted U's thereof, locking lugs engaging said flanges on said primary hooks, the loop of the inverted U of said secondary hooks resting respectively in supported contact with their concave surfaces on, and carried by, said substantially straight edge of said free legs of said primary hooks, the thus engaged relationship of said locking lugs and said flange restraining vertical displacement of said panel.

References Cited by the Examiner

UNITED STATES PATENTS

| | | | |
|---|---|---|---|
| 1,984,607 | 12/1934 | Twinckler | 138—168 |
| 2,766,861 | 10/1956 | Abramson | 52—544 X |

RICHARD W. COOKE, JR., *Primary Examiner.*